Feb. 10, 1953 — W. F. PITTMAN — 2,628,136
BEARING
Filed Sept. 12, 1947 — 3 Sheets-Sheet 1
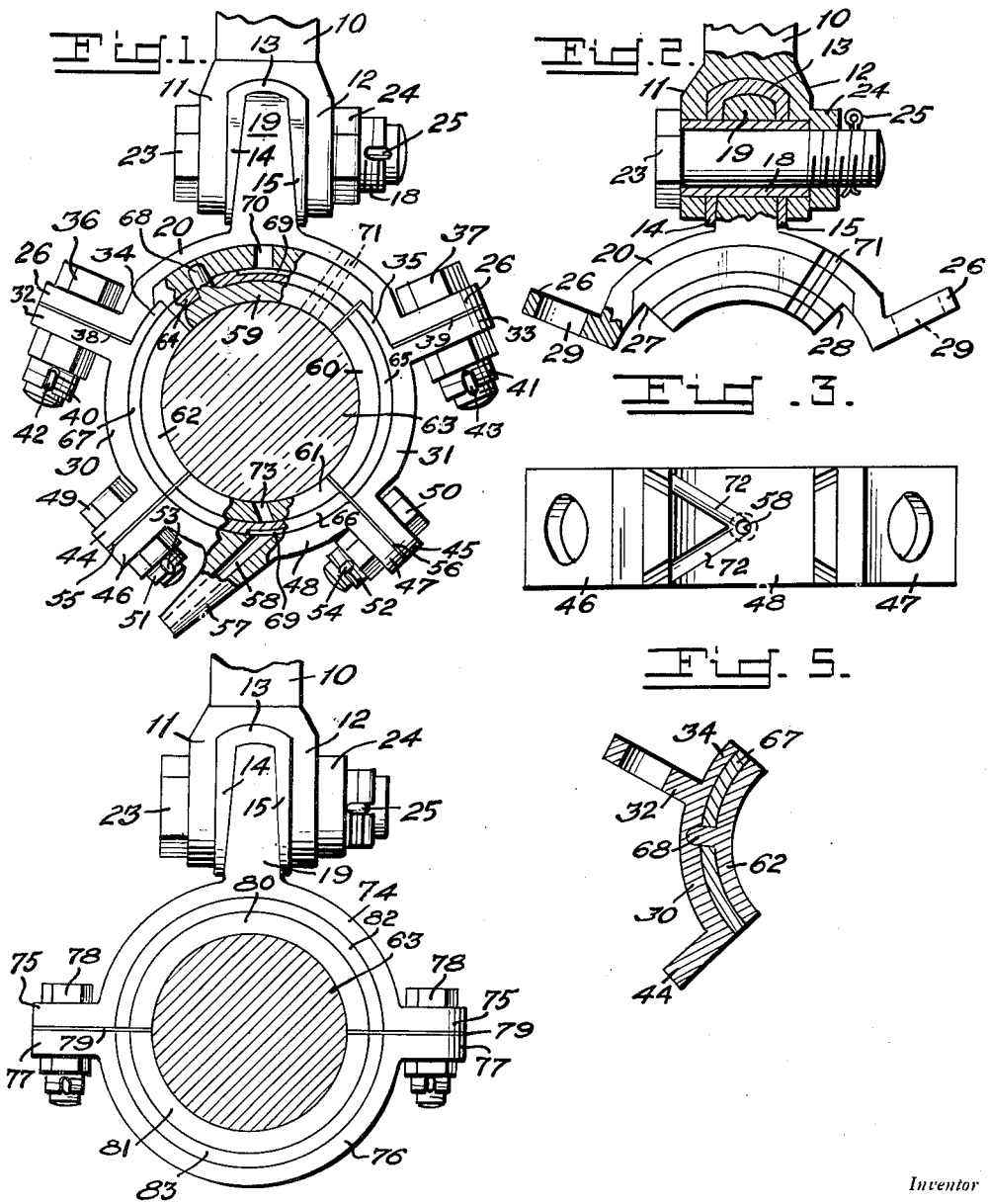
Inventor
Walter F. Pittman
By Randolph & Beavers
Attorneys Feb. 10, 1953  W. F. PITTMAN  2,628,136
BEARING
Filed Sept. 12, 1947  3 Sheets-Sheet 2
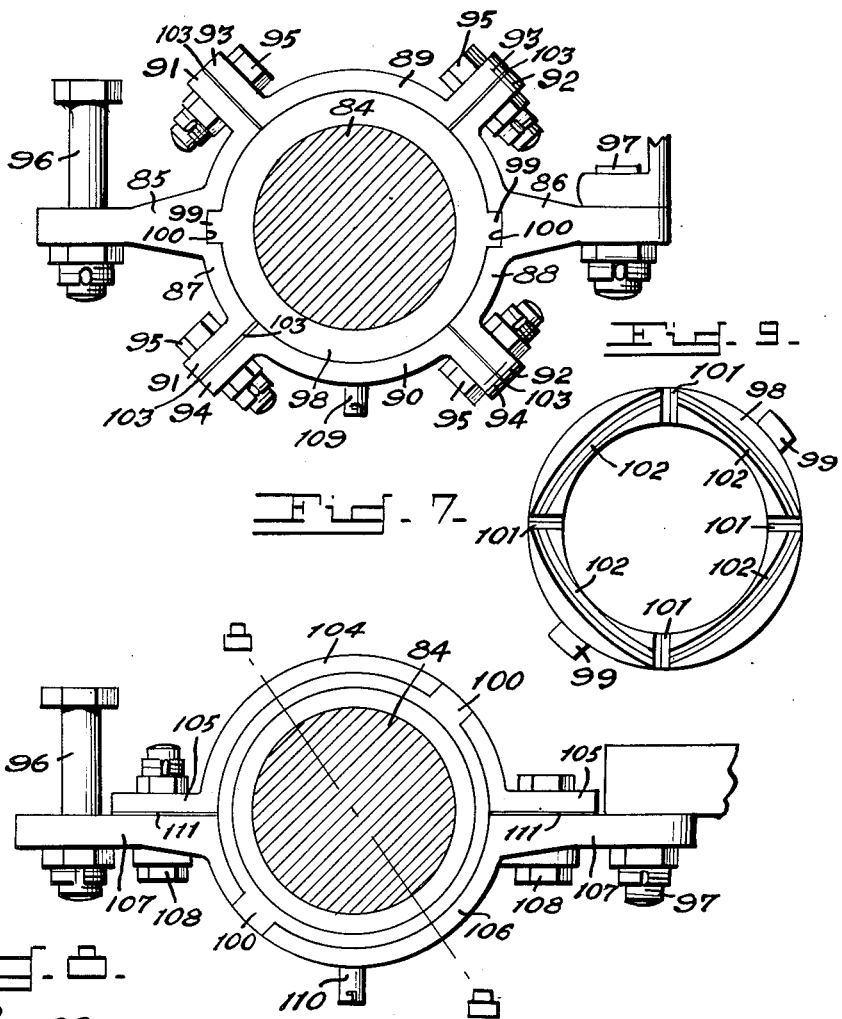
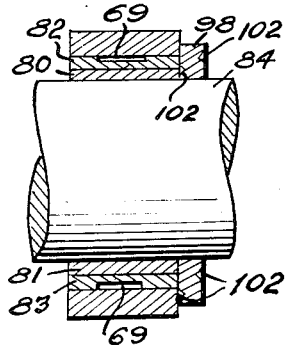
Inventor
Walter F. Pittman
By Randolph & Beavers
Attorneys Feb. 10, 1953 W. F. PITTMAN 2,628,136
BEARING
Filed Sept. 12, 1947 3 Sheets-Sheet 3
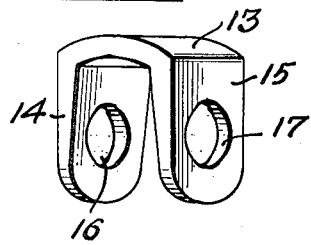
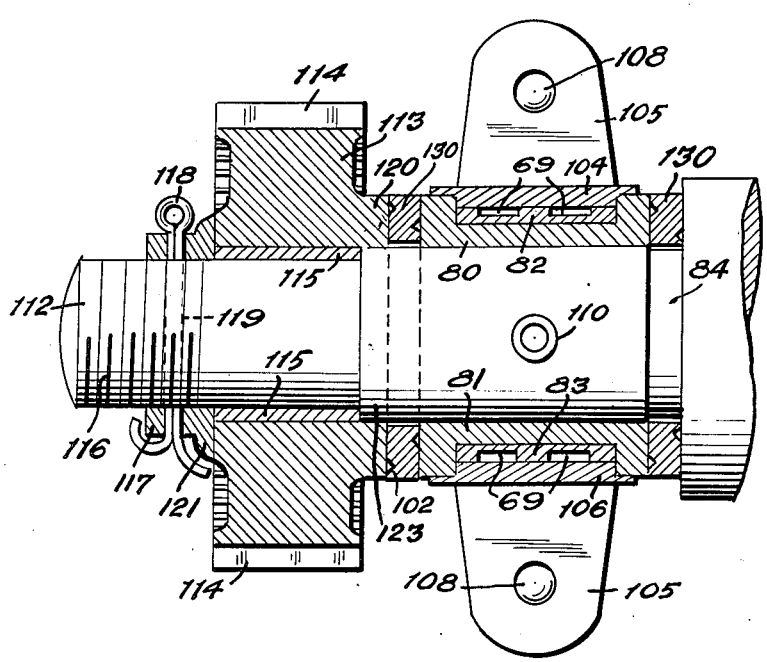
Inventor
Walter F. Pittman
By Randolph & Beavers
Attorneys Patented Feb. 10, 1953

2,628,136

UNITED STATES PATENT OFFICE 2,628,136

BEARING

Walter F. Pittman, Kenly, N. C.

Application September 12, 1947, Serial No. 773,698

1 Claim. (Cl. 308—167)

The present invention relates to bearings and it consists in the combinations, constructions and arrangements of parts herein described and claimed.

It is an object of the invention to provide a novel bearing for interconnecting a connecting rod with a crank pin bearing.

Another object of the invention is the provision of a multi-part pitman of novel construction.

Another object of the invention is the provision of a novel oiling system for a bearing.

A further object of the invention is the provision of a novel means of adjustment for a multi-part pitman with respect to a crankpin associated therewith.

Another object of the invention is the provision of a novel means for adjustment for wear upon the ends of a bearing.

A still further object of the invention is the provision of a novel cushioning band adapted to be interposed between the connecting rod and the pitman.

A further object of the invention is the provision of a device of the character set forth which may be easily assembled and disassembled.

Other and further objects of the invention will become apparent from a reading of the following specification taken in conjunction with the drawings, in which:

Figure 1 is a fragmentary elevational view, partly broken away, of an embodiment of the invention, providing means to detach or interconnect the piston rod from a crank pin bearing.

Figure 2 is a view similar to Figure 1 but broken away still further to disclose certain details of the invention, Figure 3 is a plan view of an element of the invention, Figure 4 is a view similar to Figure 1 but showing a modified form the invention may assume, Figure 5 is a sectional view showing certain details of the invention, Figure 6 is an elevational view of a detachable crankshaft journal bearing forming a part of the invention, Figure 7 is a view similar to Figure 6 showing a modified form of crank shaft journal bearing, Figure 8 is a sectional view taken along line 8—8 of Figure 7, Figure 9 is an elevational view of an element of the invention, Figures 10 and 11 are perspective views of certain elements of the invention, and Figure 12 is a fragmentary plan view, partly broken away, of a journal bearing for a crankshaft constructed in accordance with the invention.

Generally, there is provided bearing constructions comprising improvements over Patent No. 2,399,889 on May 7, 1946, granted to the present inventor and provision is made for a segmented pitman for interconnecting a connecting rod and a crankpin wherein one of the segments is adapted to overlap it contiguous segments and thus provide adjustability while at the same time providing a snugly fitting entirety. Provision is also made for a journal bearing of novel construction including thrust washers having novel oil ducts therein.

Referring now more particularly to the drawings, there is shown therein a connecting rod 10 having a pair of integrally formed dependent ears 11 and 12 between which is adapted to be fitted an inverted U-shaped cushioning member 13 whose arms 14 and 15 are provided with laterally extending openings 16 and 17, respectively. Like openings (not shown) are provided in the ears 11 and 12. A sleeve band 18 of generally cylindrical shape is adapted to be positioned in the openings in the ears 11 and 12, in the openings 16 and 17 and an opening (not shown) in a lug 19 formed integrally with an upper segment 20. Through the hollow central portion 22 of the sleeve 18, a bolt 23 is adapted to pass. A nut 24 is threadably mounted upon the threaded end of the bolt 23 and is provided with a transversely extending cotter pin 25.

The upper segment 20 is provided with an integrally formed outwardly extending lug 26 at either end and is provided at either end of its inner side with cut away portions 27 and 28. The lugs 26 have transversely extending openings 29 formed therein.

A pair of side segments 30 and 31 is provided with lugs 32 and 33, respectively, adjacent their upper ends and each of the segments is provided with an extended portion 34 and 35, respectively, which are adapted to underlie the inner ends of the upper segment 20 in the cut away portions 27 and 28, respectively, and bolts 36 and 37 are adapted to hold the lugs 26 and 32 and 26 and 33 together with shims 38 and 39 interposed between said pairs of lugs. The bolts 36 and 37 are provided with sleeves 40 and 41, respectively, of the same construction as the sleeve 18 above described and the bolts 36 and 37 are provided with cotter pins 42 and 43, respectively.

The side segments 30 and 31 are provided with integrally formed lugs 44 and 45, respectively, at their lower ends, which are adapted to engage lugs 46 and 47, respectively, formed integrally at the outer ends of a lower segment 48 by means of bolts 49 and 50, respectively, having sleeves 51 and 52, respectively, cotter pins 53 and 54, respectively, and shims 55 and 56, respectively.

The segment 48 is provided with an integrally formed oil scoop 57 having a bore 58 formed therein. Inner segments 59, 60, 61 and 62 are arranged within the outer segments 29, 31, 48 and 30, respectively and are adapted to encompass a crank pin 63 and cushioning segments 64, 65, 66 and 67 are respectively interposed between the aforesaid aligned outer and inner segments.

Each of the inner segments is provided with an outwardly extending lug detent 68 adapted to protrude through its adjacent cushioning segment into a suitable opening in the inner face of the outer segment, as best shown in Figure 1.

Indented areas 69 are provided in the outer faces of the cushioning segments 64, 65, 66 and 67 and an opening 70 in the segment 29 communicates with the area 69 in the uppermost cushioning element 64.

The segments 29 and 59 and the associated cushioning element 64 are provided with aligned openings 71. The inner face of the segment 48 is provided with a pair of outwardly extending grooves 72 which communicate with the bore 58 and the inner segment 61 is provided with an opening 73 therethrough.

In operation, it will be apparent that the various segments may be quickly and easily assembled about the crank pin 63, the bolts 36, 37, 49 and 50 and their attendant parts placed in the proper lugs and tightened and that whenever adjustment is necessary, the same may be effected by the loosening of certain of the bolts and taking up the slack thus created by further tightening the remaining bolts. The provision of the cushioning member 13 between the ears 11 and 12 of the connecting rod 10 and the lug 19 makes for an absence of noise and shock at this point in the operation of the device, as well as providing means for adjustment when wear has caused a loosening of this particular connection.

The oil scoop will cause oil to be taken in through the bore 58 and the same will be forced throughout the pitman, escaping through the openings 70 and 71. A certain amount of the oil entering through the bore 58 will circulate between the outer segments and the cushioning members 64, 65, 66 and 67, thus acting as an oil cushion and giving greater efficiency along with less wear to the pitman.

Again, it will be apparent that the detents 68 will act to keep the inner segments, the cushioning members and the outer segments in proper alignment and that the overlapping of the upper segment 29 of the portions 34 and 35 of the side segments 30 and 31, respectively, will facilitate the relative adjustment of the upper segment 29 with respect to the side segments 30 and 31.

In the form of the invention shown in Figure 4, wherein identical parts are given identical reference characters, the lug 19 is formed integrally with an upper segment 74 which is substantially semi-circular and is provided with a pair of horizontally extending lugs 75. A lower segment 76 is of substantially semi-circular shape and is provided with horizontally extending lugs 77 adapted to be fastened to the lugs 75 by means of bolts 78 having the same general construction as those heretofore described. Shims 79 are interposed between the lugs 75 and 76.

Inner segments 80 and 81 are arranged about the crank pin 63 adjacent the segments 74 and 76, respectively, and cushioning elements 82 and 83 are interposed between the segments 74 and 80 and 76 and 81, respectively.

The functioning of the pitman shown in Figure 4 is the same as that above described with relation to the device shown best in Figures 1 to 3, inclusive and it is to be understood that the various elements are similarly constructed although not shown in detail.

In Figure 6 there is shown a journal bearing for a crankshaft 84 wherein a pair of brackets 85 and 86 are formed integrally with side segments 87 and 88, respectively, which are interconnected by means of an upper segment 89 and a lower segment 90. The segments 87 and 88, respectively, are provided with pairs of lugs 91 and 92, respectively, which lugs are adapted to be fastened to pairs of lugs 93 and 94 carried by the segments 89 and 90, respectively, by means of bolts 95 of similar construction and having similar attendant parts to those heretofore described.

The brackets 85 and 86 are adapted to be fastened to the engine by means of bolts 96 and 97 or the like, forming the detachability.

Thrust members 98 having diametrically opposed outwardly extending lugs 99 adapted to fit within recesses 100 in the side segments 87 and 88 are provided at either side of the bearing. The thrust members 98 are provided with a series of radially extending oil grooves 101 which are interconnected by means of curvular grooves 102. Shims 103 are interposed between the adjacent lugs carried by the segments 87, 88, 89 and 90.

The operation of this form of the invention is as above described with respect to Figures 1 and 2, the whole being adjustable by means of the bolts 95 as aforesaid with respect to the bolts 36, 37, 49 and 50 and the thrust members 98 being positioned at either side of the journal bearing will allow for a lessened amount of friction and at the same time be adjustable laterally with respect to the crankshaft 84 as will be later described with respect to Figure 12.

In Figure 7, there is shown a journal bearing for the crankshaft 84 wherein there is provided an upper segment 104 having a pair of horizontally extending lugs 105 and a lower segment 106 having a pair of horizontally extending brackets 107 formed integrally therewith and having the lugs 105 fastened thereto by means of bolts 108 similar to those heretofore described.

At 109 in Figure 6 and at 110 in Figure 7, there is provided a conventional force feed oil connection for the bearing structure shown therein. Shims 111 are interposed between the lugs 105 and the brackets 107.

The operation of the device shown in Figure 7 is identical with that shown in Figure 6 and it is to be understood that the various elements contained therein are similar to those described above with respect to Figures 1 and 2.

Referring now to Figure 12 of the drawings, wherein the journal bearing disclosed in Figure 7 is shown mounted upon the drive shaft 84, it will be seen that there is provided a reduced portion 112 of the shaft 84 upon which is mounted a timing gear 113 having teeth 114 and which is keyed to the shaft by means of keys 115.

The outer end of the shaft is threaded, as indicated at 116 and has threadably mounted thereon a lock nut 117 which is provided with a transversely extending cotter pin 118 which is also adapted to protrude through an opening 119 in the reduced portion 112 of the shaft 84. The timing gear 113 is provided with an annular inwardly extending projection 120 which is adapted to envelope the outer end 123 of the normal portion of the shaft 84. A collar 121 is formed integrally with the lock nut 117 and bears against the timing gear 113. The operation of this form of the invention is as above described.

Thrust members or washers 130 are provided on either side of the journal bearing and are similar in construction to the thrust members 98 except that they are without the outwardly extending lugs 99.

It will be apparent that the bearings shown herein may be quickly and easily attached to and detached from a shaft. It will also be apparent that lateral wear may be compensated for by replacing the thrust members 130.

While but certain forms of the invention have been shown and described herein, it will be readily apparent to those skilled in the art that many minor modifications may be made herein without departing from the spirit of the invention or the scope of the appended claim.

What is claimed is:

A journal bearing for a crank shaft comprising, in combination, a crank shaft, a cylindrical thrust member surrounding said crank shaft and having integrally formed therewith a pair of diametrically opposed outwardly extending dogs, a pair of horizontally extending brackets mounted at either side of said crank shaft, a side segment integrally formed at the inner end of each of said brackets and each bearing against said thrust member, each of said side segments having a centrally disposed recess formed in its inner face for receiving therein one of said dogs, an upper segment bearing against said thrust member, a lower segment bearing against said thrust member, an outstanding lug formed at each end of each of said segments, and bolts adjustably connecting adjacent pairs of said lugs.

WALTER F. PITTMAN.

REFERENCES CITED

The following references are of record in the file of this patent:

UNITED STATES PATENTS

| Number | Name | Date |
|---|---|---|
| 1,254,345 | Nowosielski | Jan. 22, 1918 |
| 1,434,904 | Mansfield | Nov. 7, 1922 |
| 1,741,621 | Godfrey | Oct. 8, 1927 |
| 1,764,672 | Austin | June 17, 1930 |
| 1,790,253 | Taylor | Jan. 27, 1931 |
| 1,822,807 | Goodson | Sept. 8, 1931 |
| 2,079,357 | Morris | May 4, 1937 |
| 2,335,638 | Bogner | Nov. 30, 1943 |
| 2,399,889 | Pittman | May 7, 1946 |